United States Patent
Novotny et al.

(10) Patent No.: US 12,121,049 B2
(45) Date of Patent: Oct. 22, 2024

(54) ELECTROSTATIC DISPENSING OF AN ANTI-MICROBIAL COATING MATERIAL

(71) Applicant: NORDSON CORPORATION, Westlake, OH (US)

(72) Inventors: Mark Novotny, Avon Lake, OH (US); Brad M. Syrowski, North Ridgeville, OH (US); Jason J. Molnar, New London, OH (US); Terrence M. Fulkerson, Brunswick, OH (US); Mike Hlebovy, Westlake, OH (US); Kenneth Watson, Elyria, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 17/057,389

(22) PCT Filed: Jun. 6, 2019

(86) PCT No.: PCT/US2019/035790
§ 371 (c)(1),
(2) Date: Nov. 20, 2020

(87) PCT Pub. No.: WO2019/236845
PCT Pub. Date: Dec. 12, 2019

(65) Prior Publication Data
US 2021/0186065 A1    Jun. 24, 2021

Related U.S. Application Data

(60) Provisional application No. 62/681,162, filed on Jun. 6, 2018.

(51) Int. Cl.
*A23P 20/18* (2016.01)
*A23L 3/00* (2006.01)
(Continued)

(52) U.S. Cl.
CPC .......... *A23L 3/3589* (2013.01); *A23L 3/001* (2013.01); *A23L 3/003* (2013.01); *A23L 3/3508* (2013.01);
(Continued)

(58) Field of Classification Search
None
See application file for complete search history.

(56) References Cited

U.S. PATENT DOCUMENTS 4,313,475 A * 2/1982 Wiggins ................ B05B 5/1641
                                                                    118/506
4,878,622 A   11/1989 Jamison et al.
(Continued)

FOREIGN PATENT DOCUMENTS

EP    0807469 A2    11/1997
EP    1170060 A1    1/2002
(Continued)

OTHER PUBLICATIONS

JP 2006149269 Espacenet Translation (Year: 2006).*
(Continued)

*Primary Examiner* — Binu Thomas
(74) *Attorney, Agent, or Firm* — BakerHostetler

(57) ABSTRACT

Methods and apparatus for electrostatic dispensing fluid onto food products are disclosed. An electrostatic dispense system includes a material supply, a voltage block, and a power supply to electrostatically charge a coating material. The electrostatic dispense system further includes a dispense assembly, a conveyor through or by which a food product is configured to be conveyed, and a support that supports at least one liquid outlet of the dispense assembly. The dispense assembly dispenses the electrostatically charged coating material from the at least one liquid outlet onto the food product. The voltage block provides electrical isolation, and includes a pump that pumps the electrostatically charged coating material to the dispense assembly.

22 Claims, 8 Drawing Sheets

Figure 1:
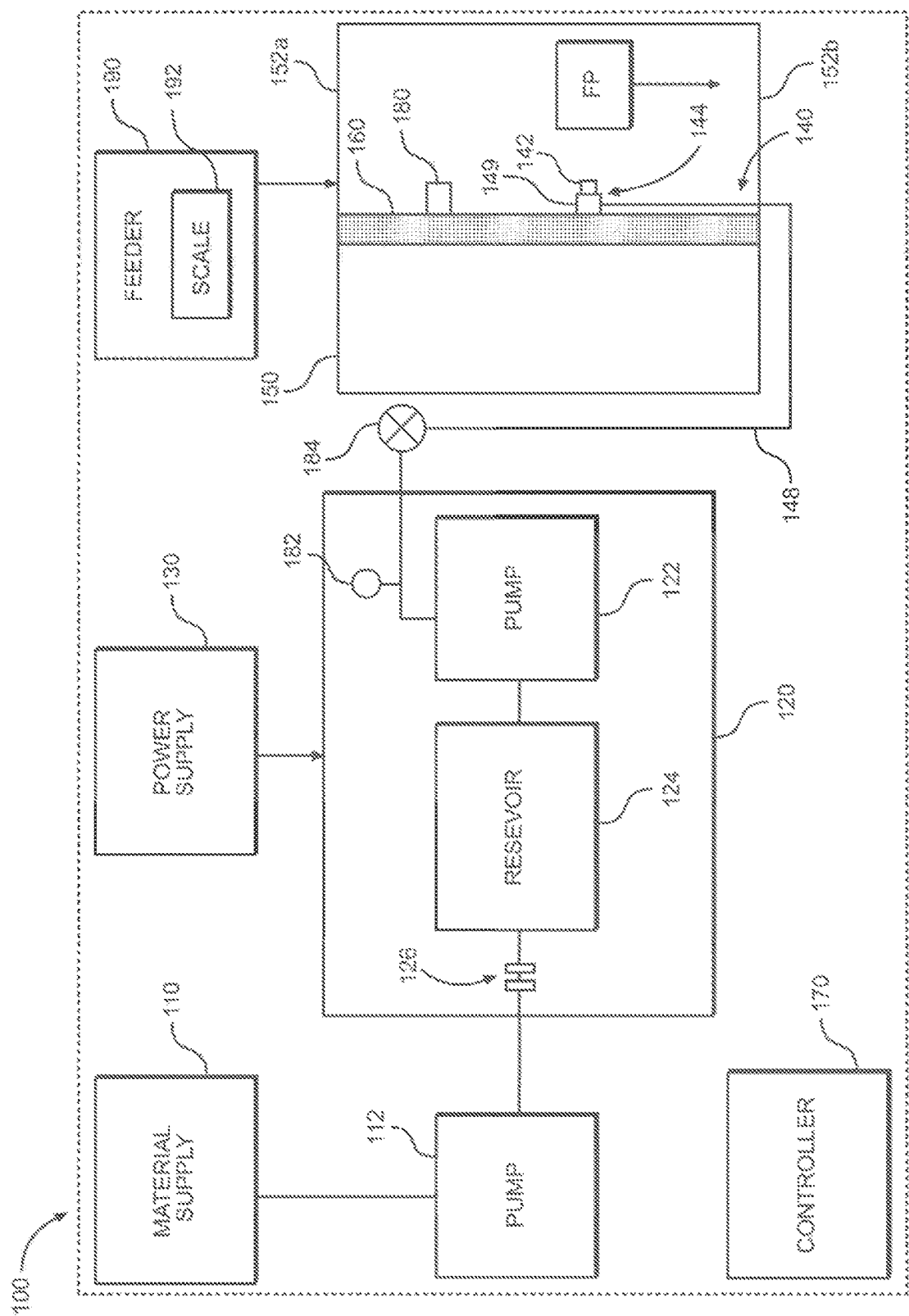

(51) Int. Cl.
*A23L 3/3508* (2006.01)
*A23L 3/358* (2006.01)
*A23L 3/3589* (2006.01)
*B05B 5/08* (2006.01)
*B05B 5/16* (2006.01)
*B05B 12/12* (2006.01)
*B05B 13/02* (2006.01)

(52) U.S. Cl.
CPC .............. *A23L 3/358* (2013.01); *A23P 20/18* (2016.08); *B05B 5/087* (2013.01); *B05B 5/1625* (2013.01); *B05B 12/122* (2013.01); *B05B 13/025* (2013.01); *B05B 13/0278* (2013.01); *A23V 2002/00* (2013.01); *B05B 12/12* (2013.01); *B05B 13/0257* (2013.01)

(56) References Cited

U.S. PATENT DOCUMENTS

| | | | | |
|---|---|---|---|---|
| 5,154,358 A | * | 10/1992 | Hartle | B05B 5/087 |
| | | | | 239/690 |
| 5,271,569 A | * | 12/1993 | Konieczynski | B05B 5/1675 |
| | | | | 239/3 |
| 5,411,210 A | * | 5/1995 | Gimple | B05B 5/1616 |
| | | | | 239/110 |
| 5,655,896 A | | 8/1997 | Konieczynski | |
| 5,776,249 A | * | 7/1998 | Rutz | B05B 7/1404 |
| | | | | 118/308 |
| 5,947,377 A | | 9/1999 | Hansinger et al. | |
| 6,021,965 A | * | 2/2000 | Hartle | B05B 5/1608 |
| | | | | 239/588 |
| 8,715,759 B2 | | 5/2014 | Larson | |
| 2017/0013849 A1 | * | 1/2017 | Thippareddi | B05B 5/087 |

FOREIGN PATENT DOCUMENTS

JP 2006149269 A * 6/2006
WO 2017/011757 A1 1/2017

OTHER PUBLICATIONS

Nordson Corporation, Iso-Flo HD and VC, Voltage Block Systems, Features information and specifications, Issued Oct. 2015, 4 pages.

* cited by examiner

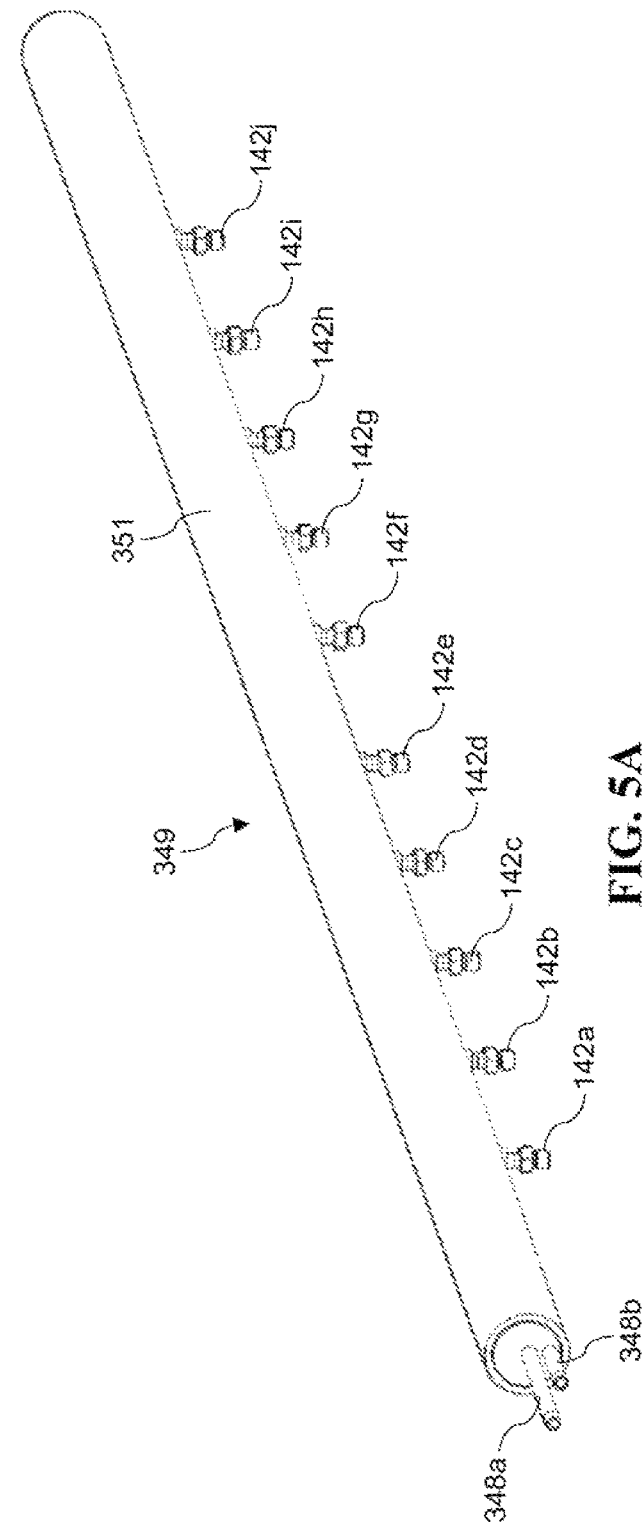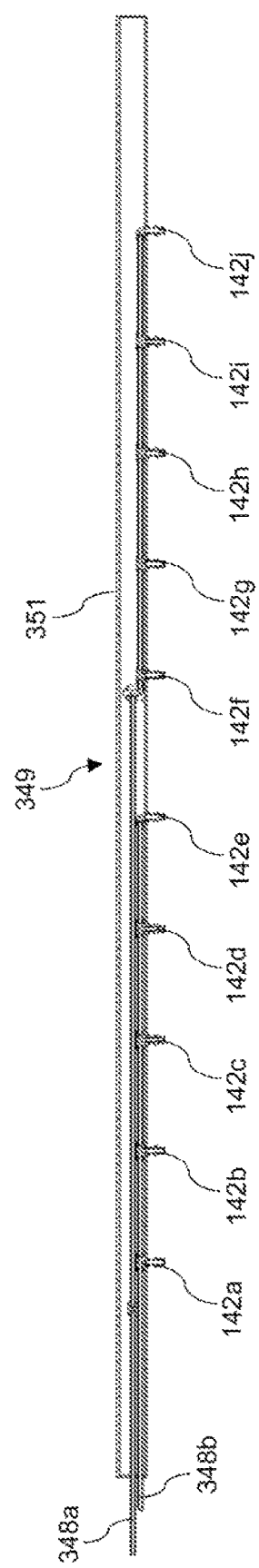

FIG. 9

FIG. 10

ELECTROSTATIC DISPENSING OF AN ANTI-MICROBIAL COATING MATERIAL

CROSS REFERENCE TO RELATED APPLICATIONS

This application is a National Stage Application of International Patent App. No. PCT/US2019/035790, filed Jun. 6, 2019, which claims the benefit of U.S. Provisional Patent App. No. 62/681,162, filed Jun. 6, 2018, the entire disclosures of both of which are hereby incorporated by reference as if set forth in their entireties herein.

TECHNICAL FIELD

The present invention generally relates to sanitization of food products, and more particularly relates to sanitization of food products using electrostatic dispensing.

BACKGROUND

Sanitization of food products is of critical importance in the food industry for the promotion of public health, the efficient processing of food products, and to comply with government regulations. Control of microbial pathogen growth, such as, e.g., *Escherichia coli* (i.e., *E. coli*), *Salmonella*, etc., is an important component of food product sanitization. Existing microbial pathogen control techniques involve coating antimicrobial agents onto the food product; however, the existing techniques suffer from inefficient utilization of the antimicrobial agents and/or are not well suited for high volume sanitization of food products.

Accordingly, there exists a need for improved microbial pathogen growth control in the food industry that more efficiently utilizes antimicrobial agents and that is adapted for high volume sanitization of food products.

SUMMARY

These needs are met, to a great extent, by an electrostatic dispense system comprising a material supply that contains a coating material, and a voltage block configured to be in fluid communication with the material supply such that the voltage block is configured to receive the coating material from the material supply. The electrostatic dispense system further comprises a power supply that is configured to electrostatically charge the coating material received by the voltage block to provide an electrostatically charged coating material. The electrostatic dispense system further comprises a dispense assembly comprising at least one liquid outlet and an internal fluid pathway that is configured to provide fluid communication between the voltage block and the liquid outlet. The dispense assembly being configured to receive the electrostatically charged coating material from the voltage block and to dispense the electrostatically charged coating material from the at least one liquid outlet. The electrostatic dispense system further comprises a conveyor through or by which a food product is configured to be conveyed, the conveyor comprising an electrically conductive material that is electrically grounded and that is electrically isolated from the internal fluid pathway, and a support that supports the at least one liquid outlet at a position adjacent to the conveyor such that the at least one liquid outlet is configured to dispense the electrostatically charged coating material onto the food product. The voltage block is interposed between the material supply and the dispense assembly and is configured to electrically isolate the material supply and the dispense assembly.

The coating material can be an antimicrobial material, such as peracetic acid. The voltage block further can include a pump that is configured to continuously pump the electrostatically charged coating material to the at least one liquid outlet at a pressure that atomizes the coating material sprayed from the at least one liquid outlet. The at least one liquid outlet can be at least one airless atomizing spray nozzle. The voltage block can include a reservoir that is configured to contain the coating material received from the material supply, and a shuttle that is configured to selectively electrically isolate the material supply and the dispense assembly.

The electrostatic dispense system can further include a container containing the power supply and the voltage block. The at least one liquid outlet can include a plurality of liquid outlets spaced apart along the support within or over the conveyor. The support can include a cantilever. The position adjacent to the conveyor, at which the support supports the at least one liquid outlet, can be at least 15 inches away from the conveyor.

The dispense assembly can further include a manifold that is mounted to the support. The at least one liquid outlet can be mounted to the manifold and can be in fluid communication with the manifold, and the internal fluid pathway can extend within the manifold. The manifold can include an electrically nonconductive material. The manifold can include at least one of a metal and a chemical-resistant polymer. The dispense assembly can further include an electrically nonconductive hose and the internal fluid pathway at least partially extends within the electrically nonconductive hose.

The electrostatic dispense system can further include a sensor that is configured to sense a presence of the food product in the conveyor. The sensor can further be configured to communicate the sensed presence of the food product to a controller that is configured to control dispensing of the electrostatically charged coating material from the at least one liquid outlet in response to the sensed presence of the food product.

The conveyor can be a barrel, a dispense booth, or a conveyor belt. The electrostatic dispense system can further include a feeder that feeds the food product through the conveyor. The feeder can include a scale that is configured to determine a weight of the food product fed to the conveyor. The electrostatic dispense system can further include a flow meter that is configured to determine a flowrate of the electrostatically charged coating material pumped to the at least one liquid outlet. The electrostatic dispense system can further include a controller. The controller can receive a weight output corresponding to the weight of the food product fed to the conveyor, and control the flowrate of the electrostatically charged coating material to the at least one liquid outlet based on the weight output.

The support can be electrically nonconductive or electrically conductive and electrically isolated from the conveyor.

The electrostatic dispense system can further include a switch that is configured to selectively ground the support. The support can support a repulsion rod that is configured to be electrostatically charged to a polarity. The power supply can be configured to electrostatically charge the coating material received by the voltage block to provide the electrostatically charged coating material at a polarity. The polarity of the repulsion rod can be the same as the polarity of the electrostatically charged coating material such that the repulsion rod is configured to repel the electrostatically charged coating material.

A method of electrostatically dispensing coating material on a food product is also disclosed. The method includes supplying a coating material from a material supply, and electrically isolating the supplied coating material from the material supply to provide an isolated coating material. The method further includes forming an electrostatically charged coating material from the isolated coating material by electrostatically charging the isolated coating material, and dispensing the electrostatically charged coating material from at least one liquid outlet while the food product is conveyed through or by a conveyor.

Dispensing the electrostatically charged coating material from the at least one liquid outlet can include atomizing the electrostatically charged coating material to form a continuous atomized spray of electrostatically charged coating material.

The method can further include sensing a presence of the food product in the conveyor and controlling the dispensing of the food product based upon the sensed presence of the food product within the controller.

The method can further include determining a weight of the food product fed to the conveyor. The method can further include receiving a weight output corresponding to the determined weight of the food product fed to the conveyor and a flowrate output corresponding to a flowrate of the electrostatically charged coating material dispensed from the at least one liquid outlet, and controlling the flowrate of the electrostatically charged coating material dispensed from the at least one liquid outlet based upon the weight output.

Various additional features and advantages of this invention will become apparent to those of ordinary skill in the art upon review of the following detailed description of the illustrative embodiments taken in conjunction with the accompanying drawings.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings:

FIG. 1 illustrates a schematic overview of an electrostatic dispense system in accordance with aspects of the invention;

FIGS. 2A and 2B illustrate an exemplary embodiment of the electrostatic dispense system including a barrel in accordance with aspects of the invention;

FIGS. 3A and 3B illustrate perspective views of a spray nozzle and a nozzle block in accordance with aspects of the invention;

FIGS. 4A and 4B illustrate another exemplary embodiment of the electrostatic dispense system including the barrel in accordance with aspects of the invention FIGS. 5A and 5B respectively illustrate a perspective view and a cross-section view of a spray manifold in accordance with aspects of the invention;

FIGS. 6A and 6B illustrate another exemplary embodiment of the electrostatic dispense system including a dispense booth in accordance with aspects of the invention;

FIG. 7 illustrates another exemplary embodiment of the electrostatic dispense system including a conveyor belt in accordance with aspects of the invention;

FIG. 8 illustrates another exemplary embodiment of the electrostatic dispense system including an overhead conveyor in accordance with aspects of the invention;

FIG. 9 illustrates another exemplary embodiment of the electrostatic dispense system including a chain-on-edge conveyor in accordance with aspects of the invention; and FIG. 10 illustrates a process of electrostatic dispensing in accordance with aspects of the invention.

DETAILED DESCRIPTION OF ILLUSTRATIVE EMBODIMENTS

FIG. 1 illustrates a schematic overview of an electrostatic dispense system 100 according to aspects of the present invention. The electrostatic dispense system 100 may include a material supply 110 that contains a coating material. The material supply 110 may be a container (not shown) and the electrostatic dispense system 100 may further include a material supply pump 112, in fluid communication with the material supply 110, that may pump the coating material from the material supply 110. Fluid communication, as used herein, may mean that two or more structures are connected, directly or indirectly, in a manner (e.g., via hoses, valves, conduits, connectors, etc.) that permits fluid to move from one structure to the other structure(s). The coating material may be an antimicrobial agent that may control and/or eliminate microbial growth. The antimicrobial agent may comprise (alone or in combination), for example, chlorine dioxide, acidified sodium chlorite, hypobromous acid, lactic acid, peracetic acid, percarboxylic acid, etc.

The electrostatic dispense system 100 may further include a voltage block 120 that may be in fluid communication with the material supply 110 and that may receive the coating material from the material supply 110. The electrostatic dispense system 100 may also include a power supply 130 that may electrostatically charge the coating material received by the voltage block 120 to provide an electrostatically charged coating material. The power supply 130 may be adjustable such that the degree to which the coating material is electrostatically charged may be variably controlled.

The electrostatic dispense system 100 may also include a dispense assembly 140 that may have one or more liquid outlet 142 and an internal fluid pathway 144 that provides fluid communication between the voltage block 120 and the liquid outlet 142. The power supply 130 may be operatively connected to the voltage block 120 and/or the dispense assembly 140 to electrostatically charge the coating material. The dispense assembly 140 may receive the electrostatically charged coating material from the voltage block 120 and may dispense the electrostatically charged coating material from the liquid outlet 142. The voltage block 120 may be interposed between the material supply 110 and the dispense assembly 140 and may electrically isolate the material supply 110 and the dispense assembly 140. Further, the voltage block 120 may include a pump 122 that may pump the electrostatically charged coating material to the liquid outlet 142. In embodiments, the pump 122 may pump the electrostatically charged coating material at a pressure that atomizes the coating material dispensed or sprayed from the liquid outlet 142. The electrostatically charged coating material may accordingly be dispensed continuously from the liquid outlet.

The electrostatic dispense system 100 may further include a conveyor 150 that a food product may be conveyed by or through. The term "conveyor," as used herein, means any structure that the food product may be conveyed by or through. The conveyor 150 may have two ends 152a, 152b through or between which the food product FP may pass. The food product FP may be any food item having exposed surface areas at risk for microbial growth. For example, the food product FP may comprise (alone or in combination) produce such as vegetables, seafood such as fish, grains, and/or meat products such as whole or partial carcasses, and meat trimmings/other materials that may be subsequently ground or otherwise processed into, e.g., ground beef, ground turkey, ground chicken, sausage, ground pork, etc. The food products may also include by-products such as bred animal-derived by-products including carcasses, hides, hoofs, heads, feathers, manure, offal, viscera, bones, fat and meat trimmings, and blood; seafood-derived by-products including skins, bones, oils, and blood; dairy-derived by-products including whey, curd, and milk sludge; vegetable-derived by-products including peelings, stems, seeds, shells, bran, trimmings residues after extraction of oil, starch, juice, and sugars. The conveyor 150 may comprise an electrically conductive material that may be electrically grounded and that may be electrically isolated from the internal fluid pathway 144.

The electrostatic dispense system 100 may further include a support 160 that supports the liquid outlet 142 at a position adjacent to the conveyor 150 such that the liquid outlet 142 may dispense the electrostatically charged coating material onto the food product FP. The position adjacent to the conveyor 150, at which the support 160 may support the liquid outlet 142, may be a position above, below, to the side of, or within the conveyor 150. The position adjacent to the conveyor 150, at which the support 160 may support the liquid outlet 142, may be a minimum distance from a surface of the conveyor 150. The surface of the conveyor 150 may be any surface of the conveyor 150 that is nearest to the position adjacent to the conveyor 150. The minimum distance may, for example, be at least 15 inches from away from the surface of the conveyor 150. Maintaining the liquid outlet 142 the minimum distance away from the surface of the conveyor 150 reduces the chances that the electrostatically charged coating material may be prematurely discharged (i.e., discharged before contact with food product FP) by the surface of the conveyor 150. The support 160 may include a cantilever that supports the liquid outlet 142 at the position adjacent to the conveyor 150.

The liquid outlet 142 may dispense the electrostatically charged coating material onto the food product FP. For example, the liquid outlet 142 may dispense the electrostatically charged coating material onto the food product FP as the food product FP passes between the two ends 152*a*, 152*b* of the conveyor 150. The support 160 may be electrically isolated from ground, from the conveyor 150, and/or from the dispense assembly 140. For example, the support 160 may be electrically nonconductive. Additionally and/or alternatively, the support 160 may comprise conductive materials. For example, the support 160 may support a repulsion rod that is electrostatically charged (e.g., via the power supply 130) at a polarity that is a same polarity as the electrostatically charged coating material. The repulsion rod may be electrically isolated from the support 160. The repulsion bar, electrostatically charged at the same polarity as the electrostatically charged coating material, may repel the electrostatically charged coating material, which may direct the coating material away from the repulsion rod and towards the food product FP thereby improving the coating on the food product FP and reducing waste. Features of the repulsion rod and associated structures for implementing operation of the same in accordance with aspects of the invention may be found in U.S. Pat. No. 5,154,358, which is expressly incorporated in its entirety by reference herein.

According to aspects of the invention, the electrostatically charged coating material may be dispensed onto the food product FP as the food product FP is conveyed by or through the conveyor 150. By electrostatically charging the coating material, the coating material may be attracted to the food product FP, which is not electrostatically charged, as the food product FP is conveyed by or through the conveyor 150. The attraction between the electrostatically charged coating material and the food product FP may improve the coverage of the coating material on the exterior surfaces of the food product FP, which may improve the efficacy of the antimicrobial control and may improve efficiency by reducing waste/overspray. In addition, in embodiments of the invention the electrostatically charged coating material may be attracted to and coat the electrically conductive material of the conveyor 150, which is grounded. By coating the conveyor 150, a secondary means for coating the food product FP may be provided as a result of incidental contact with the coated conveyor 150 as the food product FP is conveyed.

As shown schematically in FIG. 1, the voltage block 120 may be any voltage block 120 capable of electrically isolating the material supply 110 and the dispense assembly 140. Providing electrical isolation between the material supply 110 and the dispense assembly 140 enables electrostatic charging of the coating material dispensed from the dispense assembly 140 without necessitating electrical isolation of the entire material supply 110 from ground. The voltage block 120 may, for example, include a reservoir 124 that may contain the coating material received from the material supply 110 and a shuttle 126 that may selectively electrically isolate the material supply 110 and the dispense assembly 140. The shuttle 126 may be interposed between the material supply 10 and the reservoir 124. The shuttle 126 may include a shuttle coupling (e.g., a male or female coupling, not shown) that may connect to a complimentary material supply coupling (e.g., a female or male coupling, not shown) in fluid communication with the material supply 110.

The shuttle 126 may be movable (e.g., via a rod/piston arrangement, not shown) such that the shuttle coupling may be physically disconnected from the material supply coupling to provide electrical isolation between the material supply 110 and structures downstream from the shuttle 126, such as the reservoir 124, the dispense assembly 140, etc. For example, in a first position at which the shuttle coupling is connected to the material supply coupling, coating material may be pumped from the material supply 110 via the material supply pump 112 to fill the reservoir 124 of the voltage block 120. In a second position at which the shuttle 126 is moved from the first position to physically disconnect and electrically isolate the shuttle coupling and the material supply coupling, the coating material in the reservoir 124 may be electrically isolated from the material supply 110 (i.e., from ground) and an electrostatic charge may be applied to the coating material via the power supply 130.

According to embodiments of the invention (not shown), the voltage block 120 may include a plurality of shuttles, couplings, reservoirs, pumps, etc. to provide at least one parallel flow arrangement. The parallel flow arrangement may allow for continuous electrical isolation between the material supply 110 and the dispense assembly 140 and may allow the voltage block 120 to be continuously supplied with coating material from one or more parallel supply paths such that the fluid may be dispensed from the liquid outlet 142 continuously. Additional and/or alternative features of the voltage block 120 in accordance with aspects of the invention are described in U.S. Pat. No. 5,655,896, which is expressly incorporated in its entirety by reference herein.

The dispense assembly 140 may include a hose 148 that may be in fluid communication with the voltage block 120 such that the hose 148 may receive the coating material from the voltage block 120. The dispense assembly 140 may further include a connector 149 (e.g., a nozzle block 249 or a manifold 349 as discussed in detail below) in fluid communication with the hose 148 and with the liquid outlet 142 and that connects the hose 148 and the liquid outlet 142. The connector 149 may transfer the coating material from the hose 148 to the liquid outlet 142. The liquid outlet 142 may be a separate structure, such as a nozzle, that is mounted to (e.g., screwed into) the connector 149. Alternatively, the liquid outlet 142 may be formed directly in the connector 149. The liquid outlet 142 may be an airless atomizing spray nozzle, such as the atomizing spray nozzle disclosed in U.S. Pat. No. 5,947,377, which is expressly incorporated in its entirety by reference herein. Airless atomization of the electrostatically charged coating material via the liquid outlet 142 may reduce overspray to improve the transfer efficiency and utilization of the coating material and reduce operating costs.

The internal fluid pathway 144 of the dispense assembly 140 may extend within/may comprise hollow regions within, e.g., the hose 148, the connector 149 (e.g., the manifold 349 described below), the liquid outlet 142, and/or any other structures that may form the dispense assembly 140. That is, the hose 148, the connector 149, the liquid outlet 142, and/or any other structures that may form the dispense assembly 140 may include internal hollow regions that are fluidly connected and that together may define at least portions of the internal fluid pathway 144. The internal fluid pathway 144 may be electrically isolated from ground, and accordingly may electrically isolate the electrostatically charged coating material from ground such that the coating material remains electrostatically charged as the coating material is dispensed from the liquid outlet 142. Any of the structures that the internal fluid pathway 144 extends within may comprise nonconductive materials (e.g., plastic, a chemical-resistant polymer such as polyether ether ketone etc.) that may isolate the charged coating material from ground. For example, the hose 148, the connector 149, and/or the liquid outlet 142 may each comprise electrically nonconductive materials.

Any of the structures that the internal fluid pathway 144 extends within, e.g. the manifold 349, may additionally or alternatively comprise conductive materials (e.g., metal such as stainless steel) and nonconductive materials may be arranged in a manner that electrically isolates the internal fluid pathway 144 from ground to maintain the electrostatic charge of the coating material. For example, the internal fluid pathway 144 (including the manifold 349) that contacts the coating material may be formed of a corrosive-resistive material such as stainless steel, while remaining electrically isolated from a ground. In embodiments, the hose 148 may include a conductive reinforcement layer and may further include nonconductive inner and/or outer layers that provide the electrical isolation. In addition, the connector 149 (e.g., the manifold 349 described below) and/or the liquid outlet 142 may comprise a conductive material and may be supported by nonconductive materials (e.g., nonconductive fittings and/or the support 160 may comprise a nonconductive material) that isolate the connector 149 and/or the liquid outlet 142 from ground. According to aspects of the invention, structures (e.g., the connector 149 and/or the liquid outlet 142) of the dispense assembly 140 that may comprise conductive materials may be electrostatically charged by the electrostatically charged coating material. The dispense assembly 140 may be arranged in a manner to ensure that arcing does not occur from any electrostatically charged structures that comprise the dispense assembly 140. For example, electrostatically charged structures (e.g., the connector 149 and/or the liquid outlet 142) may be spaced a predetermined safe distance from each other and from grounded structures to prevent arcing.

The electrostatic dispense system 100 may further include a controller 170, e.g., a programmable controller, that may coordinate/automatically control aspects of the electrostatic dispense system 100. The controller 170 may be a programmable logic controller (PLC), a microprocessor based controller, personal computer, or another conventional control device capable of carrying out the functions described herein as understood by a person having ordinary skill in the art. For example, the controller 170 may control the pumping of the coating material, selective electrostatic isolation of the material supply 110 and the voltage block 120, etc. The controller 170 may be in electrical communication (e.g., via wired and/or wireless connections) with any of the structures of the electrostatic dispense system 100 that may be subject to automatic control, including but not limited to, the material supply pump 112, the voltage block 120, the pump 122, etc. A human machine interface (HMI) device (not shown) may be operatively connected to the controller 170 in a known manner. The HMI device may include input devices and controls, such as a keypad, pushbuttons, control knobs, a touch screen, etc., and output devices, such as displays and other visual indicators, that may be used by an operator to control the operation of the controller 170 and, thereby, control the operation of the electrostatic dispense system 100. The HMI device may further include an audio output device, such as a speaker, by which an audio alert may be communicated to an operator.

The electrostatic dispense system 100 may further include a sensor 180 (e.g., a beam sensor and/or encoder(s)), or series of sensors (not shown), that may sense the presence of the food product FP in the conveyor 150 and/or may sense a rate of operation of a feeder 190, described below. The sensor 180 may communicate the sensed presence of the food product FP to the controller 170, and the controller 170 may control dispensing of the electrostatically charged coating material from the liquid outlet 142 in response to the sensed presence of the food product FP, as described below. The electrostatic dispense system 100 may also include a flow meter 182, which may be provided, for example, within the voltage block 120. The flow meter 182 may determine a flowrate of the electrostatically charged coating material pumped to the liquid outlet 142 and may communicate the determined flowrate to the controller 170, e.g., for automatic feedback control. The electrostatic dispense system 100 may further include a valve 184 (e.g., a ball valve) that is electrically isolated from ground and that may manually or automatically initiate and/or terminate flow of the coating material to the liquid outlet 142.

The electrostatic dispense system 100 may further include the feeder 190 that may feed the food product FP to the conveyor 150. The feeder 190 may comprise, for example, a conveyor, a rail/trolley system, a chute, other aspects described in detail below, etc. Food product FP may additionally or alternatively be manually fed to the conveyor 150. The feeder 190 may include a scale 192 that may determine a weight of the food product FP fed to the open end 152a of the conveyor 150. The scale 192 may include a load cell. The electrostatic dispense system 100 may include other structures (not shown), such as a camera, that may be used to determine or estimate an amount of food product FP fed to the conveyor 150.

The electrostatic dispense system 100 may include a container 118 that the power supply 130 and the voltage block 120 are each contained within. The voltage block 120 may receive the uncharged coating material from the material supply (not shown) via a material supply hose 113. The container 118 may be sealed/wash-down rated to facilitate cleaning thereof and to protect the power supply 130 and the voltage block 120 from contaminants. The container 118 may be mounted on wheels 119 that facilitate movement of the voltage block 120 and the power supply 130.

Figure 2A:
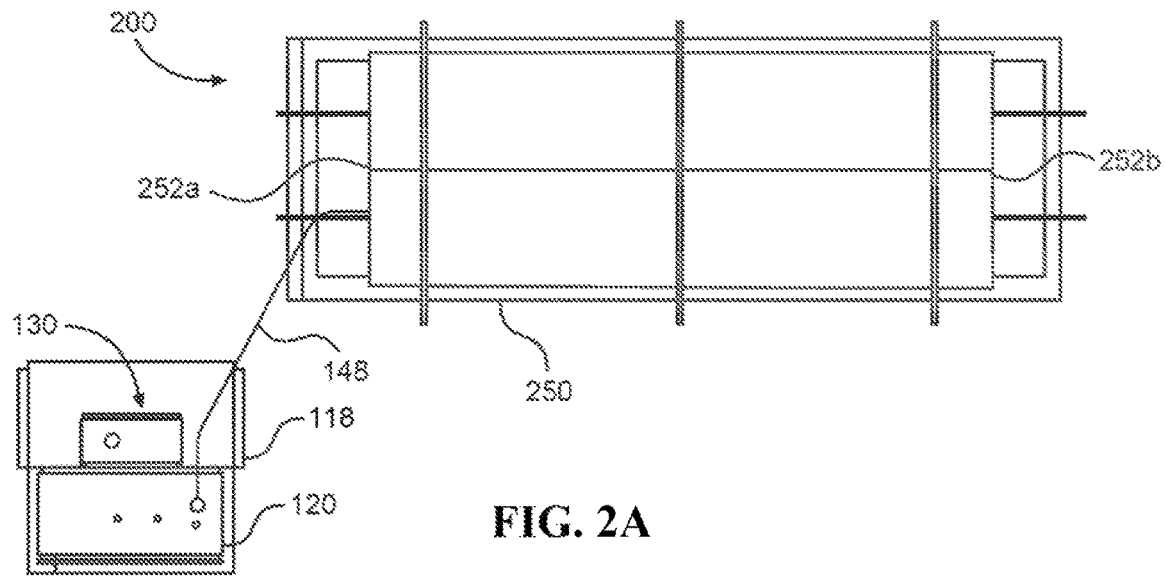
Figure 2B:
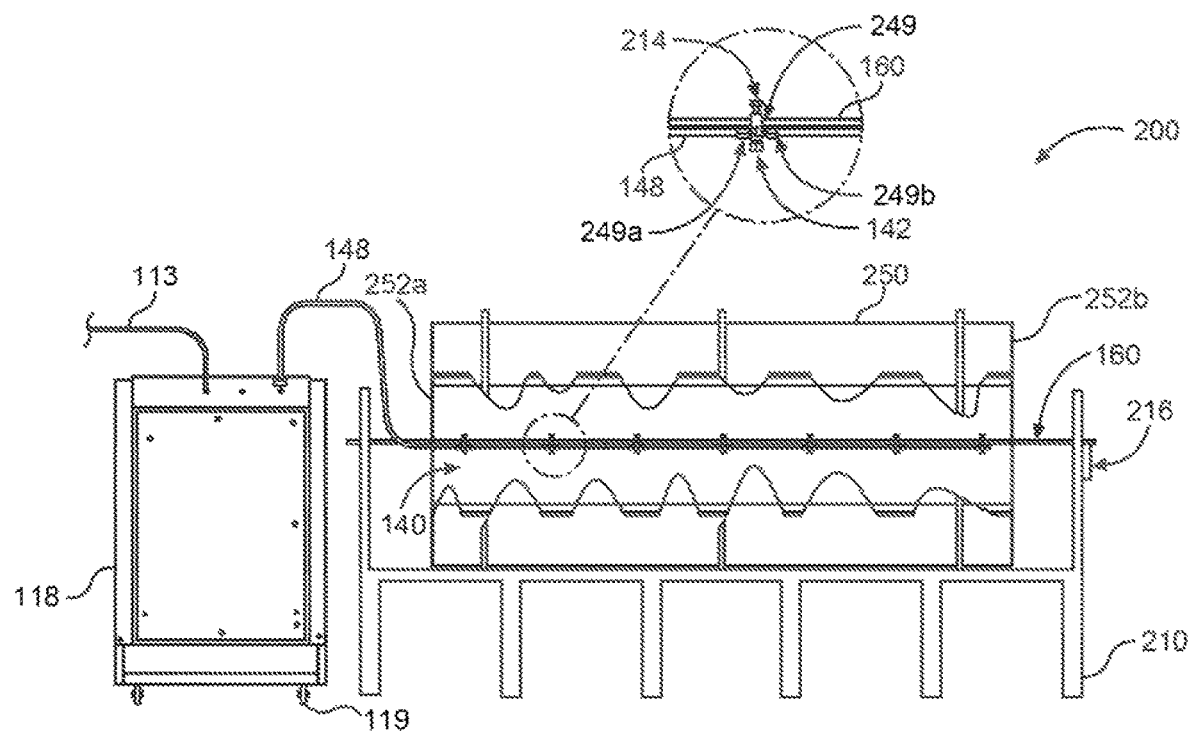
Figure 3A:
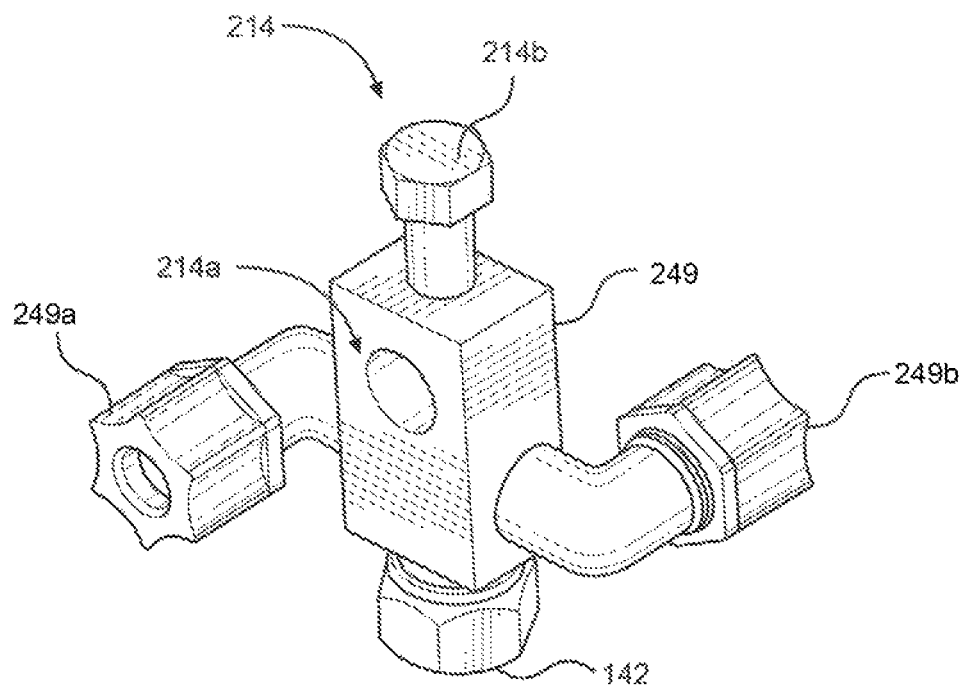
Figure 3B:
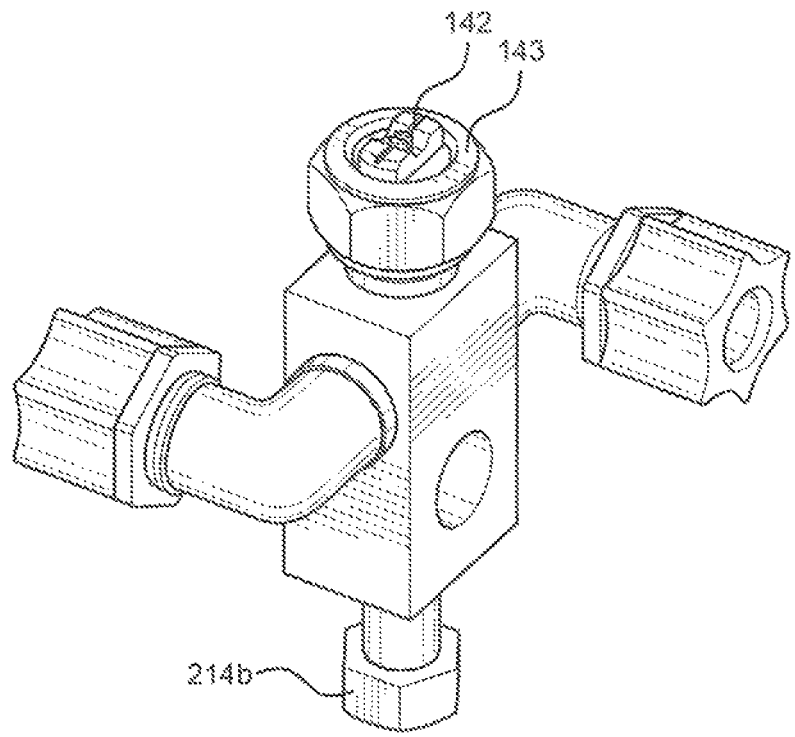

FIGS. 2A-3B shows aspects of an exemplary embodiment of the electrostatic dispense system 200 in which the connector 149 that connects the liquid outlet 142 and the hose 148 is a nozzle block 249, in accordance with the invention. FIG. 2A shows a top view of the electrostatic dispense system 200. FIG. 2B shows a side view of the electrostatic dispense system 200 including a partial cut-away view of a conveyor 250 of the exemplary embodiment. FIG. 3A shows a view of the liquid outlet 142 and the nozzle block 249 of the exemplary embodiment of the electrostatic dispense system 200. FIG. 3B shows another view of the liquid outlet 142 and the nozzle block 249 of the exemplary embodiment of the electrostatic dispense system 200. In addition to features of the electrostatic dispense system 200 shown in FIGS. 2A-3B and/or the features described below, the electrostatic dispense system 200 may also include any of the features of the electrostatic dispense system 100 of FIG. 1 (e.g., the material supply 110, the controller 170, the feeder 190, etc.) that are not mutually exclusive with the features of the electrostatic dispense system 200, and vice versa.

As shown in FIGS. 2A and 2B, the conveyor 250 of the electrostatic dispense system 200 may have a barrel shape and two open ends 252a, 252b. As a result of the two open ends 252a, 252b, the conveyor 250 may have an at least partially open interior environment during the dispense operation, which may allow for continuous feeding of the food product FP and may improve the amount of food product FP that may be processed per unit time. The conveyor 250 may be mounted to a stand 210 that may support and may electrically ground the conveyor 250. In embodiments not shown, the conveyor 250 may be mounted to the stand 210 at an incline to promote movement of the food product FP between the two open ends 252a, 252b of the conveyor 250. The inclination of the conveyor 250 may be variable. For example, the stand 210 may include a mechanism (not shown) that permits at least one of the two open ends 252a, 252b to be raised and/or lowered relative to the other of the two open ends 252a, 252b.

The conveyor 250 may further be movable relative to the stand 210 to further promote movement/agitation of the food product FP through the conveyor 250, which may improve the coverage of the coating material on the food product FP. For example, the electrostatic dispense system 200 may include a motor (not shown) and associated transmission mechanism (not shown) that may rotate, vibrate, and/or spin the conveyor 250 relative the stand 210. The conveyor 250 may include an internal surface having a topography that agitates the food product FP as the food product FP passes between the two open ends 252a, 252b of the conveyor 250. In embodiments not shown, the topography of the internal surface of the conveyor 250 may include, for example, baffles, slots, fins, paddles, stops, etc. The topography of the internal surface of the conveyor 250 may be automatically varied, for example, internal fins and/or baffles that comprise the topography may be movable within the conveyor 250 to vary the topography of the internal surface of the conveyor 250.

The dispense assembly 140 of the electrostatic dispense system 200 may include a plurality of liquid outlets 142 and/or nozzle blocks 249 spaced apart along the support 160 at the position adjacent to the conveyor 250. The plurality of liquid outlets 142 and/or nozzle blocks 249 may be spaced a predetermined distance apart from each other to prevent arcing and/or to enhance the distribution of liquid dispensed within the conveyor 250.

FIG. 2B includes a magnified view of one of the plurality of liquid outlets 142 attached to one of the plurality of nozzle blocks 249, and FIGS. 3A and 3B shows a view of the liquid outlet 142 and nozzle block 249 isolated from the electrostatic dispense system 200. The liquid outlet 142 may be fluidly connected (e.g., via a nozzle nut) to the nozzle block 249. In embodiments not shown, a plurality of liquid outlets 142 may be fluidly connected to a single nozzle block. The nozzle block 249 may include, e.g., two openings 249a, 249b that may be in fluid communication with the hose 148 of the dispense assembly 140 to supply the nozzle block 249 and the liquid outlet 142 with the electrostatically charged coating material from the voltage block 120. In embodiments not shown, the nozzle block 249 may include only one opening in fluid communication with the hose 148 such that the nozzle block 249 forms a dead head including a terminal liquid outlet 142, at which the dispense assembly 140 terminates.

The nozzle block 249 may further include a fixture 214 that connects the nozzle block 249 to the support 160. The fixture 214 may allow selective positional manipulation of the nozzle block 249 relative to the support 160, which may accordingly permit manipulation of the dispense or spray direction of the liquid outlet 142. The fixture 214 may include, for example, a through hole 214a extending through the nozzle block 249. The support 160 may extend through the through hole 214a to mount the nozzle block 249 to the support 160. The fixture 214 may also include a fastener 214b, such as a hex bolt, that may fasten the nozzle block 249 to the support 160 and may selectively lock the nozzle block 249 in one or more radial positions on the support 160 to control the dispense or spray direction of the liquid outlet 142. In embodiments not shown, the fixture 214 may automatically be movable to vary the dispense or spray direction during operation of the electrostatic dispense system 200.

The electrostatic dispense system 200 may further include a switch 216 or disconnect that may selectively electrically ground the support 160 when the electrostatic dispense system 200 is not in use. By selectively grounding the support 160, any electrostatic charge that may have built during use of the electrostatic dispense system 200 may be safely discharged to prevent injury to a user that may contact the support 160. In embodiments not shown, switches/disconnects may be provided to selectively discharge any structures of the electrostatic dispense system 200 that may build charge during operation of the electrostatic dispense system 200 to improve the safety of the electrostatic dispense system 200.

Figure 4A:
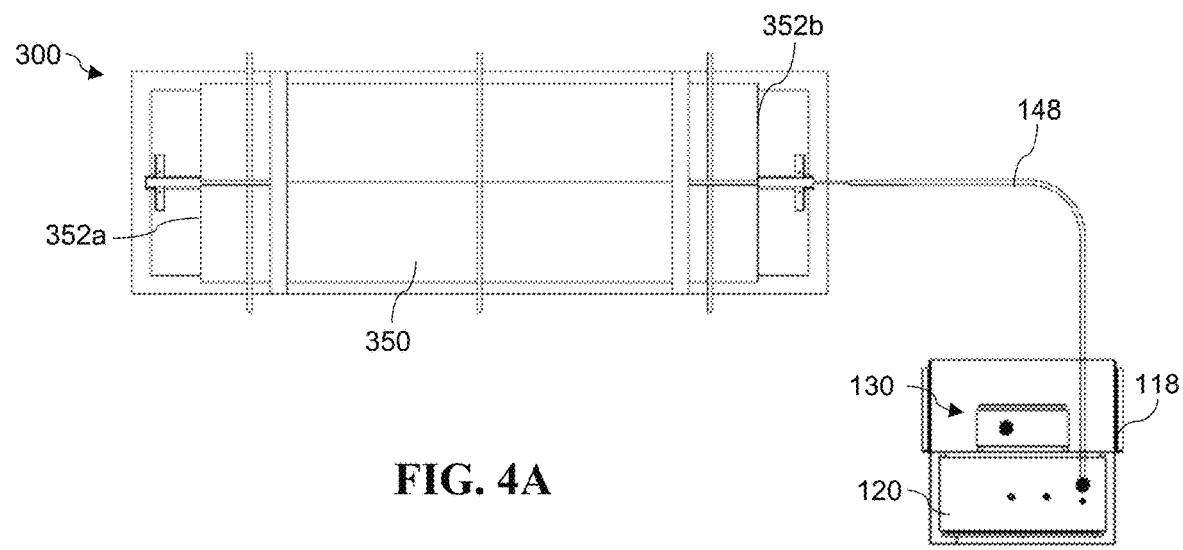

FIGS. 4A-5B shows aspects of another exemplary embodiment of the electrostatic dispense system 300 in which the connector 149 that connects the liquid outlet 142 and the hose 148 is a manifold 349, in accordance with the invention. FIG. 4A shows a top view of the electrostatic dispense system 300. FIG. 4B shows a side view of the electrostatic dispense system 300 including a partial cut-away view of a conveyor 350 of the exemplary embodiment. FIG. 5A shows a view of the manifold 349 including a plurality of liquid outlets 142a-142j. In addition to features of the electrostatic dispense system 300 shown in FIGS. 4A-5B and/or the features described below, the electrostatic dispense system 300 may also include any of the features of the electrostatic dispense systems 100 (e.g., the material supply 110, the controller 170, the feeder 190, etc.) and/or 200 (e.g., the switch 216) that are not mutually exclusive with the features of the electrostatic dispense system 300, and vice versa.

Figure 4B:
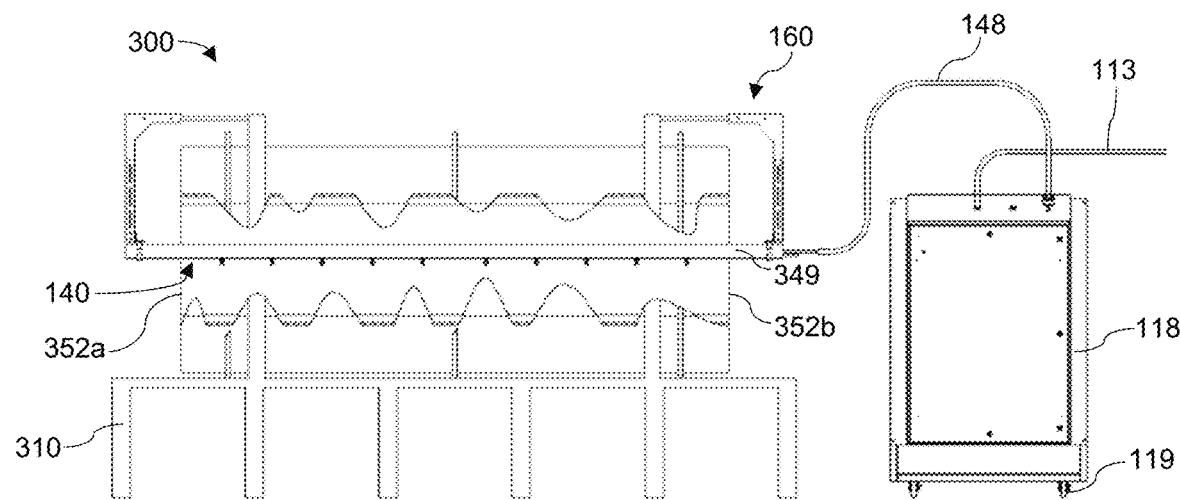

As shown in FIGS. 4A and 4B, the conveyor 350 of the electrostatic dispense system 300 may have a barrel shape and two open ends 352a, 352b. As a result of the two open ends 352a, 352b, the conveyor 350 may have an at least partially open interior environment during the dispense operation, which may allow for continuous feeding of the food product FP and may improve the amount of food product FP that may be processed per unit time. The conveyor 350 may be mounted to a stand 310 that may support and may electrically ground the conveyor 350. In embodiments not shown, the conveyor 350 may be mounted to the stand 310 at an incline to promote movement of the food product FP between the two open ends 352a, 352b of the conveyor 350. The inclination of the conveyor 350 may be variable. For example, the stand 310 may include a mechanism (not shown) that permits at least one of the two open ends 352a, 352b to be raised and/or lowered relative to the other of the two open ends 352a, 352b.

The conveyor 350 may further be movable relative to the stand 310 to further promote movement-agitation of the food product FP through the conveyor 350, which may improve the coverage of the coating material on the food product FP. For example, the electrostatic dispense system 300 may include a motor (not shown) and associated transmission mechanism (not shown) that may rotate, vibrate, and/or spin the conveyor 350 relative the stand 310. The conveyor 350 may include an internal surface having a topography that agitates the food product FP as the food product FP passes between the two open ends 352a, 352b of the conveyor 350. In embodiments not shown, the topography of the internal surface of the conveyor 350 may include, for example, baffles, slots, fins, paddles, stops, etc. The topography of the internal surface of the conveyor 350 may be automatically varied, for example, internal fins and/or baffles that comprise the topography may be movable within the conveyor 350 to vary the topography of the internal surface of the conveyor 350.

The dispense assembly 140 of the electrostatic dispense system 300 may include the manifold 349 having the plurality of liquid outlets 142a-142j spaced apart along the manifold 349 at the position adjacent to the conveyor 350. The plurality of liquid outlets 142a-142j may be spaced a predetermined distance apart from each other to prevent arcing and/or to enhance the distribution of liquid dispensed within the conveyor 350. The plurality of liquid outlets 142a-142j may be airless atomizing spray nozzles. In addition, the support 160 may include a cantilever that supports the manifold 349.

The plurality of liquid outlets 142a-142j may be fluidly connected to the manifold 349. The manifold 349 may include, e.g., two conduits 348a, 348b that may be in fluid communication with the hose 148 of the dispense assembly 140 and with the plurality of liquid outlets 142a-142j. The two conduits 348a, 348b may be supplied with coating material by the same system (e.g., including the material supply 110, the voltage block 120, the hose 148, etc.). Alternatively, the conduits 348a, 348b may be supplied with coating material by two separate systems, each including a material supply 110, voltage block 120, a hose 148, etc. By supplying the two conduits 348a, 348b with coating material separately, the flow rate of coating material through each conduit 348a, 348b may be improved to enable, for example, atomization at the plurality of liquid outlets 142a-142j. The manifold 349 may include a hollow tube 351 that the conduits 348a, 348b extend within and the plurality of liquid outlets 142a-142j may be screwed into. The conduits 348a, 348b may supply the plurality of liquid outlets 142a-142j with the electrostatically charged coating material from the voltage block 120. The conduits 348a, 348b may be a part of the internal fluid pathway 144 and may be electrically isolated from ground, and accordingly may electrically isolate the electrostatically charged coating material from ground such that the coating material remains electrostatically charged as the coating material is dispensed from the liquid outlet 142. The manifold 349, including the conduits 348a, 348b and/or the hollow tube 351, may comprise nonconductive materials (e.g., plastic, a chemical-resistant polymer such as polyether ether ketone etc.) that may isolate the charged coating material from ground. In embodiments, the conduits 348a, 348b may be PVC pipes. The manifold 349, conduits 348a, 348b and/or the hollow tube 351, may additionally comprise conductive materials (e.g., metal) and nonconductive materials may be arranged in a manner that electrically isolates interior of the conduits 348a, 348b from ground to maintain the electrostatic charge of the coating material. For example, the conduits 348a, 348b may include a conductive reinforcement layer and may further include nonconductive inner and/or outer layers that provide the electrical isolation. For example, the conduits 348a, 348b may comprise a conductive material and may be supported by nonconductive materials (e.g., nonconductive fittings and/or the hollow tube 351 may comprise a nonconductive material) that isolate the conduits 348a, 348b and/or the liquid outlet 142 from ground.

Figure 6A:
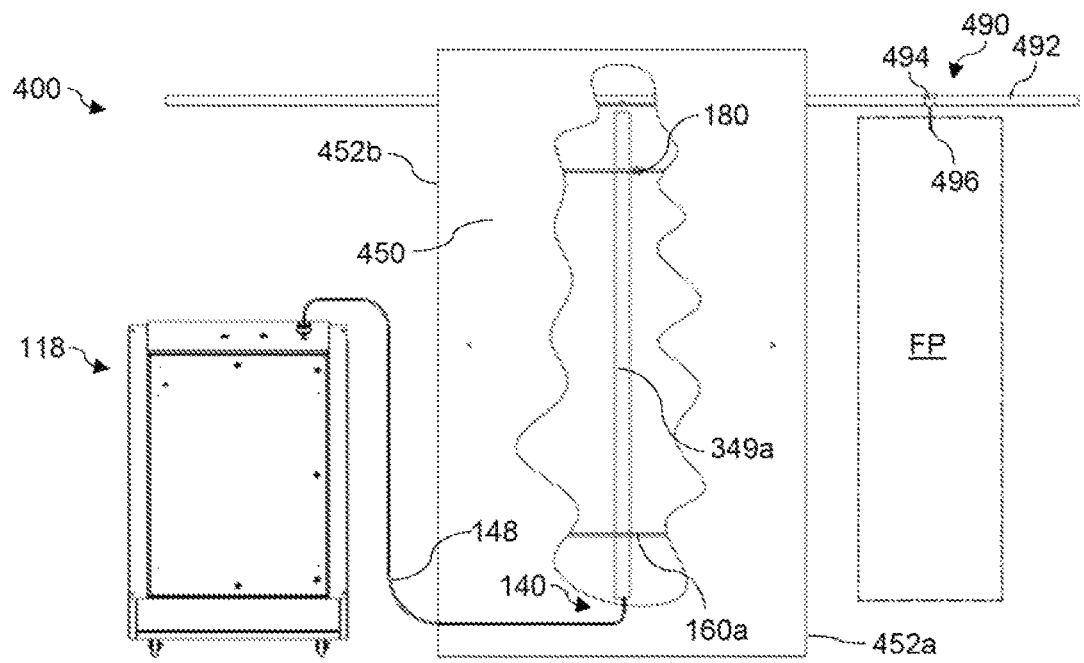
Figure 6B:
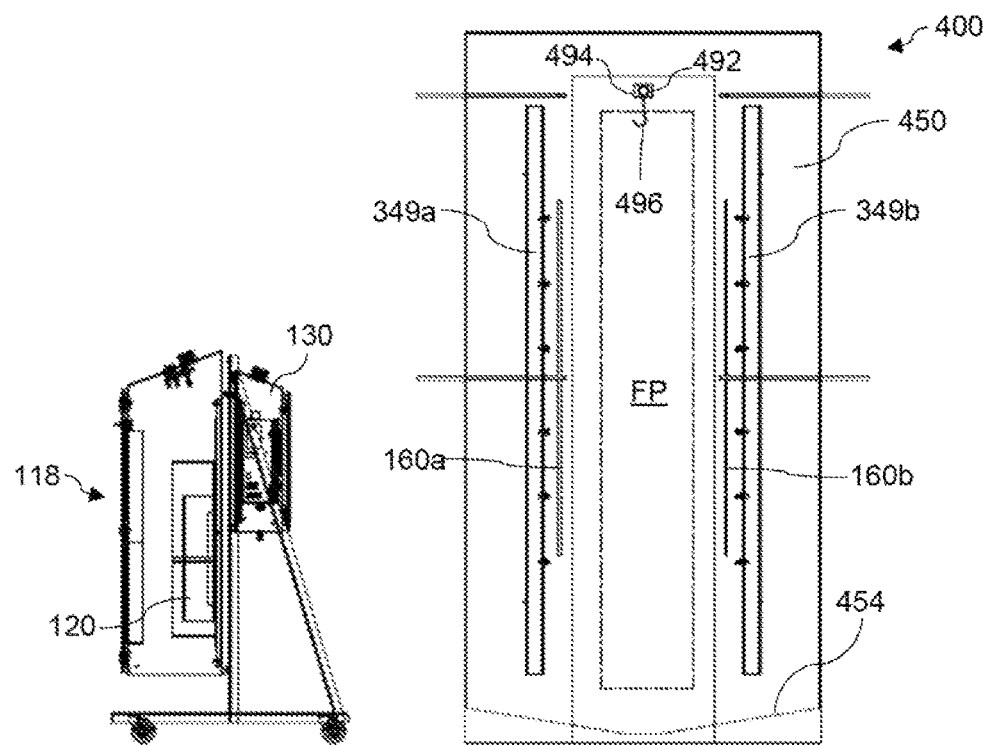

FIGS. 6A and 68 show aspects of another exemplary embodiment of the electrostatic dispense system 400 having a dispense booth in accordance with aspects of the invention. FIG. 6A shows a side view of the electrostatic dispense system 400 including a partial cut-away view of the conveyor 450. FIG. 6B shows another side view of the electrostatic dispense system 400. In addition to features of the electrostatic dispense system 400 shown in FIGS. 6A and 6B and/or described below, the electrostatic dispense system 400 may also include any of the features of the electrostatic dispense systems 100 (e.g., the material supply 110, the container 118, the controller 170, etc.), 200, and 300 that are not mutually exclusive with the features of the electrostatic dispense system 400, and vice versa.

As shown in FIGS. 6A and 68, the conveyor 450 of the electrostatic dispense system 400 may be a dispense booth with two open ends 452a, 452b. As a result of the two open ends 452a, 452b, the conveyor 450 may have an at least partially open interior environment during the dispense operation, which may allow for continuous feeding of the food product FP and may improve the amount of food product FP that may be processed per unit time. The conveyor 450 may include a sloped floor 454 such that excess coating material may be funneled to a drain (not shown) for collection and/or disposal. The dispense assembly 140 may include first and second manifolds 349a, 349b respectively mounted in a vertical orientation on first and second supports 160a, 160b. The first and second manifolds 349a, 349b may each include the features of the manifold 349, discussed above. The first and second manifolds 349a, 349b may be respectively mounted on the first and second supports 160a, 160b on both sides of the conveyor 450 to dispense the fluid onto the food product FP from both sides. The first and second supports 160a, 160b may include a cantilever. Further, the first and second supports 160a, 160b may support a repulsion rod or bar, as described above. The repulsion rod or bar may be electrically isolated from the support 160.

The electrostatic dispense system 400 may include the container 118, having the voltage block 120 and the power supply 130 contained therein. The container 118 may be provided adjacent to the conveyor 450 and may supply the electrostatic coating material to the hose 148 of the dispense assembly 140.

The electrostatic dispense system 400 may include a feeder 490 that extends through the two open ends 452a, 452b of the conveyor 450. The feeder 490 may, for example, include a motor operatively connected to a drive system 492 (having any of, e.g., a rail, a belt, a chain, etc.). The feeder 490 may further include a carriage 494 having a hook 496 that extends from the carriage 494. The carriage 494 may be slideably connected to the drive system 492 and may be conveyed along the drive system 492 through the two open ends 452a, 452b of the conveyor 450. The hook 496 may hold the food product FP suspended from the drive system 492. Accordingly, the food product FP may be conveyed and fed through the two opens ends 452a, 452b of the conveyor 450 as the electrostatic coating material is dispensed onto the food product FP via the dispense assembly 140, which may enable the coating of larger food products such as whole or half carcasses. The sensor 180 may be mounted within the conveyor 450 on the support 160 and may detect that the food product FP is conveyed through the conveyor 450. The controller 170 may control dispensing such that the electrostatically charged coating material is only dispensed upon a sensing (via the sensor 180) of the food product FP within the conveyor 450.

Figure 7:
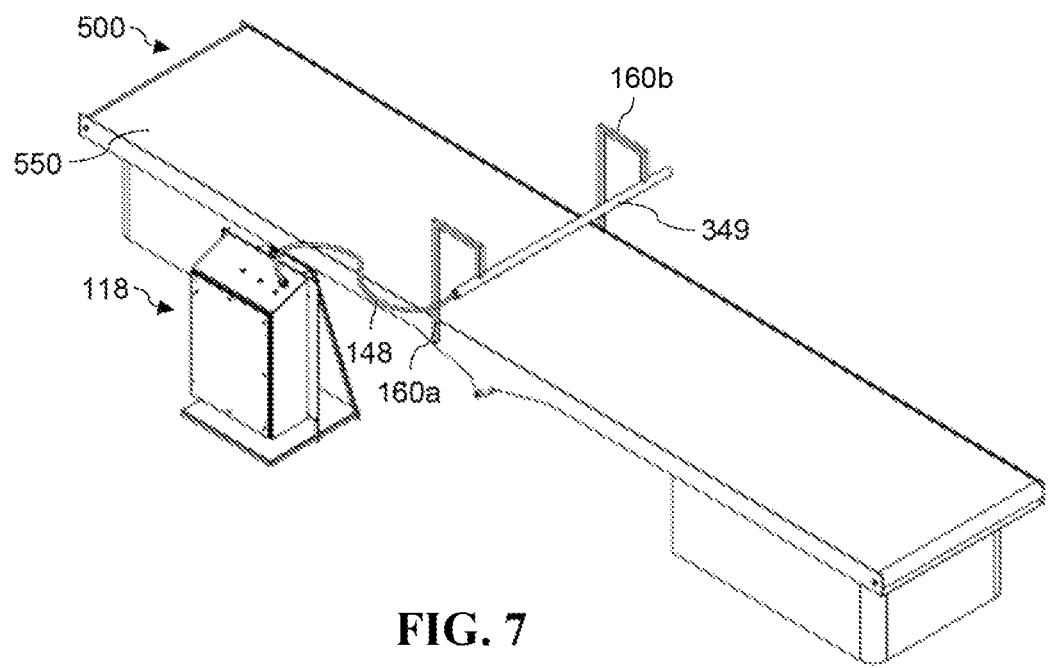

FIG. 7 shows aspects of another exemplary embodiment of the electrostatic dispense system 500 having a conveyor belt in accordance with aspects of the invention. In addition to features of the electrostatic dispense system 500 shown in FIG. 7 and/or described below, the electrostatic dispense system 500 may also include any of the features of the electrostatic dispense systems 100 (e.g., the material supply 110, the container 118, the controller 170, etc.), 200, 300, and 400 that are not mutually exclusive with the features of the electrostatic dispense system 500, and vice versa.

As shown in FIG. 7, the conveyor 550 of the electrostatic dispense system 500 may be a flat conveyor belt that may receive a food product FP thereon and convey the food product forwards and/or backwards along a conveying direction of the conveyor 550. The electrostatic dispense system 500 may include the manifold 349 mounted above the conveyor 550 and extending in a direction perpendicular to the conveying direction of the conveyor 550. The manifold 349 may be mounted above the conveyor 550 via first and second supports 160a, 160b provided on both sides of the conveyor 550. The first and second supports 160a, 160b may include a cantilever. The electrostatic dispense system 500 may include the container 118, having the voltage block 120 and the power supply 130 contained therein. The container 118 may be provided adjacent to the conveyor 550 and may supply the electrostatic coating material to the hose 148 and from the hose 148 to the manifold 349 for dispensing on the food product FP.

Figure 8:
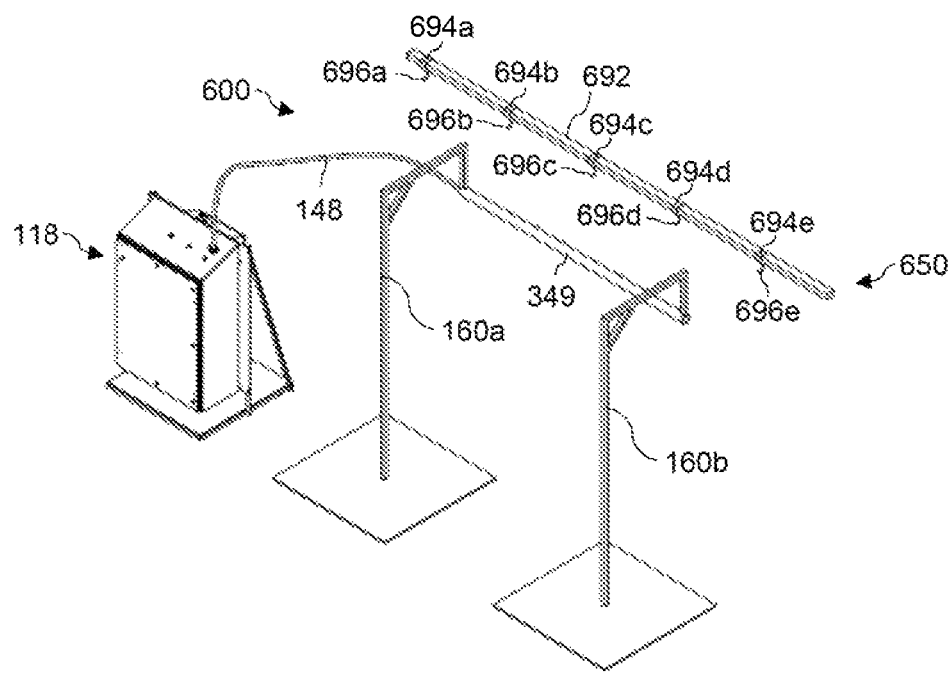

FIG. 8 shows aspects of another exemplary embodiment of the electrostatic dispense system 600 having an overhead conveyor 650 in accordance with aspects of the invention. In addition to features of the electrostatic dispense system 600 shown in FIG. 8 and/or described below, the electrostatic dispense system 600 may also include any of the features of the electrostatic dispense systems 100 (e.g., the material supply 110, the container 118, the controller 170, etc.), 200, 300, 400, and 500 that are not mutually exclusive with the features of the electrostatic dispense system 600, and vice versa.

As shown in FIG. 8, the conveyor 650 of the electrostatic dispense system 600 may be an overhead conveyor 650. The electrostatic dispense system 600 may include the manifold 349 mounted below the conveyor 650 and extending in a direction parallel to a conveying direction of the conveyor 650. The manifold 349 may be mounted below the conveyor 650 via first and second supports 160a, 160b that stand to the side of the conveyor 650. The first and second supports 160a, 160b may include a cantilever. The electrostatic dispense system 600 may include the container 118, having the voltage block 120 and the power supply 130 contained therein. The container 118 may be provided adjacent to the conveyor 650 and may supply the electrostatic coating material to the hose 148 and from the hose 148 to the manifold 349 for dispensing on the food product FP.

The overhead conveyor 650 may include a motor operatively connected to a drive system 692 (having any of, e.g., a rail, a belt, a chain, etc.). The overhead conveyor 650 may further include a plurality of carriages 694a-694e, each having a respective hook 696a-696e that extend therefrom and that may hold food product FP thereon. The plurality of carriages 694a-694e may be slideably connected to the drive system 692 and may be conveyed along the conveying direction and above the manifold 349 via the drive system 692.

Figures 9, 10:
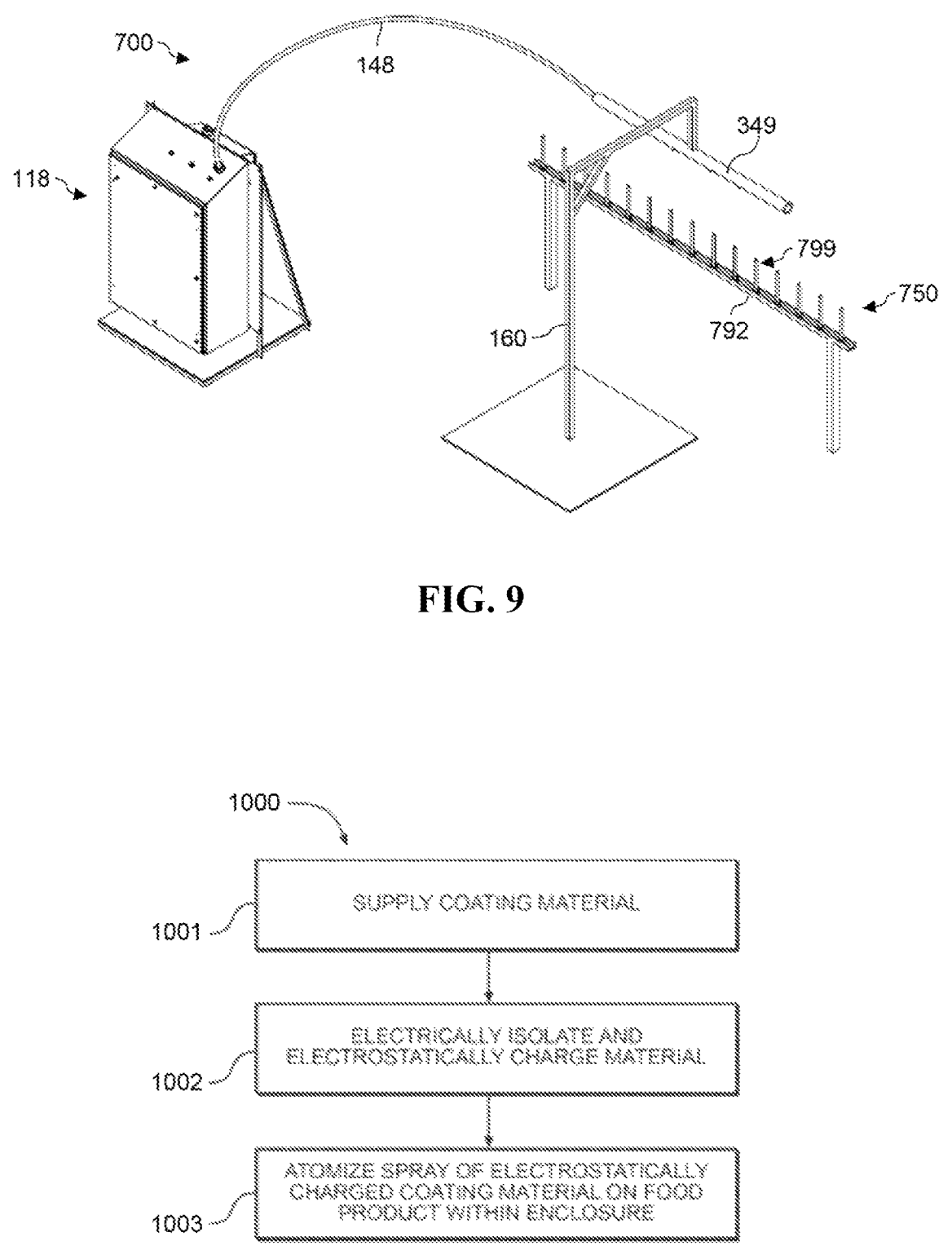

FIG. 9 shows aspects of another exemplary embodiment of the electrostatic dispense system 700 having a chain-on-edge conveyor 750 in accordance with aspects of the invention. In addition to features of the electrostatic dispense system 700 shown in FIG. 9 and/or described below, the electrostatic dispense system 700 may also include any of the features of the electrostatic dispense systems 100 (e.g., the material supply 110, the container 118, the controller 170, etc.), 200, 300, 400, 500, and 600 that are not mutually exclusive with the features of the electrostatic dispense system 700, and vice versa.

As shown in FIG. 9, the conveyor 750 of the electrostatic dispense system 700 may be a chain-on-edge conveyor 750. The electrostatic dispense system 700 may include the manifold 349 mounted above the conveyor 750 and extending in a direction parallel to a conveying direction of the conveyor 750. The manifold 349 may be mounted above the conveyor 750 via a support 160 that stands to the side of the conveyor 750. The support 160 may include a cantilever. The electrostatic dispense system 700 may include the container 118, having the voltage block 120 and the power supply 130 contained therein. The container 118 may be provided adjacent to the conveyor 750 and may supply the electrostatic coating material to the hose 148 and from the hose 148 to the manifold 349 for dispensing on the food product FP.

The chain-on-edge conveyor 750 may include a motor operatively connected to a drive system 792 (having any of, e.g., a rail, a belt, a chain, etc.). The chain-on-edge conveyor 750 may further include a plurality of stakes 799 that extend vertically from the drive system 792 and that may hold food product FP thereon. The plurality of stakes 799 may be slideably connected to the drive system 792 and may be conveyed along the conveying direction and below the manifold 349 via the drive system 792.

FIG. 10 shows an exemplary process 1000 of electrostatically dispensing onto a food product FP. The process 1000 may be used with any of the embodiments of the electrostatic dispense system discussed above, and aspects of the process 1000 may be automatically implemented by the controller 170. At step 1001 of the process 1000, the coating material may be supplied from the material supply 110 to the voltage block 120. For example, the coating material may be pumped from the material supply 110 via the material supply pump 112.

At step 1002, the process 1000 may include electrically isolating the supplied coting material from the material supply 110 to provide an isolated coating material. For example, the supplied coating material may be stored in the reservoir 124 of the voltage block 120 and may thereafter be electrically isolated from the material supply 110 via movement of the shuttle 116. After forming the isolated coating material, step 1002 may including forming an electrostatically charged coating material from the isolated coating material by electrostatically charging the isolated coating material. For example, the isolated coating material may be electrostatically charged by the power supply 130 in the reservoir 124 of the voltage block 120 and/or in the internal fluid pathway 144.

At step 1003, food product FP may be conveyed through or by the conveyor (e.g., the conveyor 150, 250, 350, 450, 550, 650, or 750) and the electrostatically charged coating material may be pumped to at least one liquid outlet 142 to dispense the electrostatically charged coating material onto the food product FP. The electrostatically charged coating material may be dispensed continuously. In embodiments, the liquid outlet 142 may be a spray nozzle and the pump 172 may be controlled to form an atomized spray of the electrostatically charged coating material to coat the food product FP. The pumping of the electrostatically charged coating material may be initiated by a user manually, or automatically via the controller 170. For example, the pumping of the electrostatically charged coating material may be initiated by the controller 170 in response to a sensed presence of the food product FP from the sensor 180. In addition, the controller 170 may automatically control the flowrate of the coating material pumped to the liquid outlet 142. For example, the controller 170 may receive a weight output (e.g., an electrical output from the feeder 190 representing weight of the food product FP as measured by the scale 192) corresponding to the weight of the food product FP fed to the conveyor. The controller 170 may automatically control operation of the pump 122 (e.g., by varying power applied to the pump 122 to control the pump speed) in response to the received weight output. The controller 170 may control the flowrate of the electrostatically charged coating materials to the liquid outlet 142 based on the weight output. The controller 170 may further receive a flowrate output (e.g., from the flow meter 182) corresponding to the flowrate of the electrostatically charged coating material pumped to the liquid outlet 142 for feedback control. For example, the controller 170 may include stored target flowrates for the electrostatically charged coating material for various weights/quantities of food product FP, and may iteratively adjust the pump 122 until the flow meter 182 indicates that the target flowrate has been achieved.

Step 1003 may further include dispensing the electrostatically charged coating material on the food product FP, while the food product FP is conveyed through or by the conveyor. In embodiments, an atomized spray of electrostatically charged coating material may be sprayed onto the food product FP. Accordingly, the electrostatically charged coating material may be dispensed onto the food product FP as the food product FP passes through or between the two ends of the conveyor. By electrostatically charging the coating material, the coating material may be attracted to the food product FP, which is not electrostatically charged, as the food product FP is conveyed through or by the conveyor. The attraction between the electrostatically charged coating material and the food product FP may improve the coverage of the coating material on the exterior surfaces of the food product FP, which may improve the efficacy of the antimicrobial control and may improve efficiency by reducing waste.

It will be appreciated that the foregoing description provides examples of the disclosed machine. However, it is contemplated that other implementations of the invention may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated. All methods described herein can be performed in any suitable order unless otherwise indicated herein or otherwise clearly contradicted by context.

What is claimed is:

1. An electrostatic dispense system, comprising:
a material supply that contains a coating material;
a voltage block configured to be in fluid communication with the material supply such that the voltage block is configured to receive the coating material from the material supply wherein the voltage block comprises a reservoir configured to store at least a portion of the coating material received from the material supply and the voltage block comprises a shuttle coupled to the reservoir and the material supply that comprises the coating material;
a power supply that is configured to electrostatically charge the coating material received by the voltage block to provide an electrostatically charged coating material;
a dispense assembly comprising at least one liquid outlet and an internal fluid pathway that is configured to provide fluid communication between the voltage block and the liquid outlet, the dispense assembly being configured to receive the electrostatically charged coating material from the voltage block and to dispense the electrostatically charged coating material from the at least one liquid outlet onto a food product with a flow rate, determined by a controller, based on a determined property of the food product;
a conveyor through or by which the food product is configured to be conveyed; and
a support that supports the at least one liquid outlet at a position adjacent to the conveyor such that the at least one liquid outlet is configured to dispense the electrostatically charged coating material onto the food product, wherein the voltage block is interposed between the material supply and the dispense assembly and is configured to electrically isolate, by the shuttle, the material supply and the dispense assembly, and wherein the electrostatic dispense system is configured to adjust a pump until a flow meter indicates a target flow rate is obtained based on target flow rates associated with the electrostatically charged coating material associated with various properties of the food product.

2. The electrostatic dispense system of claim 1, wherein the voltage block further comprises the pump that is configured to continuously pump the electrostatically charged coating material to the at least one liquid outlet at a pressure that atomizes the coating material sprayed from the at least one liquid outlet.

3. The electrostatic dispense system of claim 2, wherein the at least one liquid outlet comprises at least one airless atomizing spray nozzle.

4. The electrostatic dispense system of claim 1, wherein:
the electrically isolate further comprises selectively electrically isolating the material supply and the dispense assembly; and
wherein the property of the food product comprises a weight of the food product or a quantity of the food product.

5. The electrostatic dispense system of claim 1, further comprising a container comprising the power supply and the voltage block.

6. The electrostatic dispense system of claim 1, wherein the at least one liquid outlet comprises a plurality of liquid outlets spaced apart along the support within or over the conveyor.

7. The electrostatic dispense system of claim 1, wherein the dispense assembly further comprises a manifold that is mounted to the support, wherein:
the at least one liquid outlet is mounted to the manifold and is in fluid communication with the manifold, and
the internal fluid pathway extends within the manifold.

8. The electrostatic dispense system of claim 7, wherein the manifold comprises an electrically nonconductive material.

9. The electrostatic dispense system of claim 7, wherein the manifold comprises at least one of a metal or a chemical-resistant polymer.

10. The electrostatic dispense system of claim 7, wherein the dispense assembly further comprises an electrically nonconductive hose and the internal fluid pathway at least partially extends within the electrically nonconductive hose.

11. The electrostatic dispense system of claim 1, further comprising a sensor that is configured to sense a presence of the food product in the conveyor, the sensor further being configured to communicate the sensed presence of the food product to the controller that is configured to control dispensing of the electrostatically charged coating material from the at least one liquid outlet in response to the sensed presence of the food product.

12. The electrostatic dispense system of claim 1, wherein the conveyor comprises a barrel, a dispense booth, or a conveyor belt.

13. The electrostatic dispense system of claim 1, further comprising:
a feeder that feeds the food product through the conveyor; and
automatically control operation of the pump, by varying power applied to the pump to control speed of the pump, in response to the property of the food product.

14. The electrostatic dispense system of claim 1, wherein the support is electrically nonconductive, or the support is electrically conductive and the support is electrically isolated from the conveyor.

15. The electrostatic dispense system of claim 1, wherein:
the support supports a repulsion rod that is configured to be electrostatically charged to a polarity,
the power supply is configured to electrostatically charge the coating material received by the voltage block to provide the electrostatically charged coating material at a polarity, and
the polarity of the repulsion rod is a same as the polarity of the electrostatically charged coating material such that the repulsion rod is configured to repel the electrostatically charged coating material.

16. The electrostatic dispense system of claim 1, wherein:
the conveyor comprises an electrically conductive material that is electrically grounded and that is electrically isolated from the internal fluid pathway; and
a flow rate of the electrostatically charged coating material to the liquid outlet, is controlled, based on the property of the food product.

17. The electrostatic dispense system of claim 1, wherein the property comprises a weight of the food product.

18. The electrostatic dispense system of claim 1, wherein the property comprises a quantity of the food product.

19. A method comprising:
supplying a material that contains a coating material;
providing a voltage block configured to be in fluid communication with the material supply such that the voltage block is configured to receive the coating material from the material supply wherein the voltage block comprises a reservoir configured to store at least a portion of the coating material received from the material supply and the voltage block comprises a shuttle coupled to the reservoir and the material supply that comprises the coating material;
providing a power supply that is configured to electrostatically charge the coating material received by the voltage block to provide an electrostatically charged coating material;
providing a dispense assembly comprising at least one liquid outlet and an internal fluid pathway that is configured to provide fluid communication between the voltage block and the liquid outlet, the dispense assembly being configured to receive the electrostatically charged coating material from the voltage block and to dispense the electrostatically charged coating material from the at least one liquid outlet onto a food product with a flow rate, determined by a controller, based on a determined property of the food product;
conveying, by a conveyor, the food product;
supporting, by a support, the at least one liquid outlet at a position adjacent to the conveyor such that the at least one liquid outlet is configured to dispense the electrostatically charged coating material onto the food product;
interposing the voltage block between the material supply and the dispense assembly and the voltage block is configured to electrically isolate, by the shuttle, the material supply and the dispense assembly; and
facilitating adjusting of a pump until a flow meter indicates a target flow rate is obtained based on target flow rates associated with the electrostatically coating material associated with various properties of the food product.

20. An electrostatic dispense system, comprising:
a material supply that contains a coating material;
a voltage block configured to be in fluid communication with the material supply such that the voltage block is configured to receive the coating material from the material supply;
a power supply that is configured to electrostatically charge the coating material received by the voltage block to provide an electrostatically charged coating material;
a dispense assembly comprising at least one liquid outlet and an internal fluid pathway that is configured to provide fluid communication between the voltage block and the liquid outlet, the dispense assembly being configured to receive the electrostatically charged coating material from the voltage block and to dispense the electrostatically charged coating material from the at least one liquid outlet;
a conveyor through or by which a food product is configured to be conveyed; and
a support that supports the at least one liquid outlet at a position adjacent to the conveyor such that the at least one liquid outlet is configured to dispense the electrostatically charged coating material onto the food product; and
a feeder that feeds the food product through the conveyor,
wherein the voltage block is interposed between the material supply and the dispense assembly and is configured to electrically isolate the material supply and the dispense assembly; and
wherein the feeder comprises a scale that is configured to determine a weight of the food product fed to the conveyor.

21. The electrostatic dispense system of claim 20, further comprising:
a flow meter that is configured to determine a flowrate of the electrostatically charged coating material pumped by the at least one liquid outlet.

22. The electrostatic dispense system of claim 21, further comprising a controller that is configured to:
receive a weight output corresponding to the weight of the food product fed to the conveyor; and
control the flowrate of the electrostatically charged coating material to the at least one liquid outlet based on the weight output.

* * * * *